United States Patent
Negrila et al.

(10) Patent No.: US 9,373,179 B2
(45) Date of Patent: Jun. 21, 2016

(54) SALIENCY-PRESERVING DISTINCTIVE LOW-FOOTPRINT PHOTOGRAPH AGING EFFECT

(71) Applicant: Microsoft Corporation, Redmond, WA (US)

(72) Inventors: Catalin Negrila, Redmond, WA (US); John Gabriel D'Angelo, Seattle, WA (US); Allison Light, Seattle, WA (US); David Lee, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/312,562

(22) Filed: Jun. 23, 2014

(65) Prior Publication Data
US 2015/0371409 A1    Dec. 24, 2015

(51) Int. Cl.
| | |
|---|---|
| G06K 9/40 | (2006.01) |
| G06T 11/00 | (2006.01) |
| G06T 5/00 | (2006.01) |
| G06T 7/40 | (2006.01) |
| G11B 27/031 | (2006.01) |
| H04N 5/262 | (2006.01) |

(52) U.S. Cl.
CPC ............... *G06T 11/001* (2013.01); *G06T 5/00* (2013.01); *G06T 5/002* (2013.01); *G06T 7/408* (2013.01); *G11B 27/031* (2013.01); *H04N 5/2621* (2013.01); *G06T 2207/20204* (2013.01)

(58) Field of Classification Search
None
See application file for complete search history.

(56) References Cited

U.S. PATENT DOCUMENTS

| | | | |
|---|---|---|---|
| 4,868,653 A | 9/1989 | Golin | |
| 5,475,425 A * | 12/1995 | Przyborski | H04N 5/262 |
| | | | 348/239 |
| 5,544,258 A | 8/1996 | Levien | |
| 5,687,011 A * | 11/1997 | Mowry | G11B 27/028 |
| | | | 348/104 |
| 6,028,960 A | 2/2000 | Graf | |
| 6,283,858 B1 * | 9/2001 | Hayes, Jr. | G06T 11/00 |
| | | | 345/418 |
| 6,297,825 B1 | 10/2001 | Madden | |
| 6,389,181 B2 | 5/2002 | Shaffer | |
| 6,757,027 B1 | 6/2004 | Edwards | |
| 7,082,211 B2 | 7/2006 | Simon et al. | |
| 7,194,114 B2 | 3/2007 | Schneiderman | |

(Continued)

FOREIGN PATENT DOCUMENTS

| | | |
|---|---|---|
| EP | 1 965 389 A2 | 9/2008 |
| EP | 1965389 A2 | 9/2008 |

(Continued)

OTHER PUBLICATIONS

Lanitis et al., "Toward Automatic Simulation of Aging Effects on Face Images," IEEE Trans. PAMI, vol. 24, No. 4, Apr. 2002.*

(Continued)

*Primary Examiner* — Feng Niu
(74) *Attorney, Agent, or Firm* — Judy Yee; Jim Banowsky; Micky Minhas (57) ABSTRACT

Technologies for modifying a digital image to take on the appearance of an antique image. Such modifying is typically based on generating and rendering various effects that are blended with the input image, such as color transformation, simulating film grain, dust, fibers, tears, and vintage borders. Such effects may be rendered to various layers that are overlaid on a color transformed image resulting in what appears to be an antique image.

20 Claims, 9 Drawing Sheets

(56) References Cited

U.S. PATENT DOCUMENTS

| | | |
|---|---|---|
| 7,200,561 B2 | 4/2007 | Moriya |
| 7,337,112 B2 | 2/2008 | Moriya |
| 7,551,754 B2 | 6/2009 | Steinberg |
| 7,577,297 B2 | 8/2009 | Mori |
| 7,580,952 B2 | 8/2009 | Logan |
| 7,639,877 B2 | 12/2009 | Shiota |
| 7,680,327 B2 | 3/2010 | Weiss |
| 7,715,598 B2 | 5/2010 | Li |
| 7,864,967 B2 | 1/2011 | Takeuchi |
| 7,978,925 B1 | 7/2011 | Souchard |
| 8,078,623 B2 | 12/2011 | Chou |
| 8,150,098 B2 | 4/2012 | Gallagher |
| 8,155,400 B2 | 4/2012 | Bronstein |
| 8,165,352 B1 | 4/2012 | Mohanty |
| 8,212,894 B2 | 7/2012 | Nozaki |
| 8,224,036 B2 | 7/2012 | Maruyama |
| 8,306,280 B2 | 11/2012 | Nozaki |
| 8,331,632 B1 | 12/2012 | Mohanty |
| 8,345,934 B2 | 1/2013 | Obrador |
| 8,358,811 B2 | 1/2013 | Adams |
| 8,384,791 B2 | 2/2013 | Porter |
| 8,488,847 B2 | 7/2013 | Nozaki |
| 8,611,678 B2 | 12/2013 | Hanson |
| 8,620,649 B2 | 12/2013 | Gao |
| 8,705,806 B2 | 4/2014 | Nakano |
| 2003/0068100 A1 | 4/2003 | Covell |
| 2004/0240711 A1 | 12/2004 | Hamza |
| 2005/0163372 A1 | 7/2005 | Kida |
| 2006/0034542 A1* | 2/2006 | Aoyama ............ G06K 9/00275 382/276 |
| 2006/0088209 A1 | 4/2006 | Yu |
| 2006/0244845 A1* | 11/2006 | Craig .................. G11B 27/322 348/231.3 |
| 2006/0280341 A1 | 12/2006 | Koshizen |
| 2006/0290705 A1 | 12/2006 | White et al. |
| 2007/0002478 A1* | 1/2007 | Mowry .................. G02B 5/223 359/885 |
| 2007/0053607 A1 | 3/2007 | Mitsunaga |
| 2007/0058878 A1* | 3/2007 | Gomilla .............. H04N 19/176 382/254 |
| 2007/0172099 A1 | 7/2007 | Park |
| 2008/0014563 A1 | 1/2008 | Visani |
| 2008/0183751 A1 | 7/2008 | Cazier et al. |
| 2008/0204598 A1 | 8/2008 | Maurer et al. |
| 2008/0212894 A1* | 9/2008 | Demirli .................. A61B 5/441 382/276 |
| 2009/0028380 A1* | 1/2009 | Hillebrand ............ G06T 7/0028 382/100 |
| 2009/0087099 A1 | 4/2009 | Nakamura |
| 2009/0116749 A1 | 5/2009 | Cristinacce |
| 2009/0180671 A1 | 7/2009 | Lee |
| 2009/0185723 A1 | 7/2009 | Kurtz |
| 2009/0313546 A1 | 12/2009 | Katpelly |
| 2010/0027663 A1 | 2/2010 | Dai |
| 2010/0054544 A1 | 3/2010 | Arguelles |
| 2010/0189313 A1 | 7/2010 | Prokoski |
| 2010/0205177 A1 | 8/2010 | Sato |
| 2011/0007174 A1 | 1/2011 | Bacivarov |
| 2011/0010319 A1 | 1/2011 | Harada |
| 2011/0064331 A1 | 3/2011 | Andres Del Valle |
| 2011/0091113 A1 | 4/2011 | Ito |
| 2011/0129159 A1 | 6/2011 | Cifarelli |
| 2011/0135166 A1 | 6/2011 | Wechsler |
| 2011/0158536 A1 | 6/2011 | Nakano |
| 2011/0176058 A1 | 7/2011 | Biswas et al. |
| 2012/0027311 A1 | 2/2012 | Cok |
| 2012/0076427 A1 | 3/2012 | Hibino |
| 2012/0106859 A1 | 5/2012 | Cheatle |
| 2012/0188382 A1 | 7/2012 | Morrison |
| 2012/0308124 A1 | 12/2012 | Belhumeur |
| 2013/0148864 A1 | 6/2013 | Dolson |
| 2013/0156275 A1 | 6/2013 | Amacker |
| 2013/0226587 A1 | 8/2013 | Cheung |
| 2013/0227415 A1 | 8/2013 | Gregg |
| 2013/0243328 A1 | 9/2013 | Irie |
| 2013/0266196 A1 | 10/2013 | Kono |
| 2014/0006420 A1 | 1/2014 | Sparrow |
| 2014/0029859 A1 | 1/2014 | Libin |
| 2014/0046914 A1 | 2/2014 | Das |
| 2014/0050419 A1* | 2/2014 | Lerios ..................... G06T 11/60 382/276 |
| 2014/0072242 A1* | 3/2014 | Wei ...................... H04N 19/176 382/299 |

FOREIGN PATENT DOCUMENTS

| | | |
|---|---|---|
| EP | 2 096 577 A2 | 9/2009 |
| EP | 2 267 655 A2 | 12/2010 |
| EP | 2 312 462 A1 | 4/2011 |
| WO | 2009/128021 A1 | 10/2009 |
| WO | 2011/014138 A1 | 2/2011 |

OTHER PUBLICATIONS

Lu, et al., "Context Aware Textures", In Journal of ACM Transactions on Graphics, vol. 26 Issue 1, Jan. 2007, 31 pages.

Gooch, et al., "Color2Gray: Salience-Preserving Color Removal", In Journal of ACM Transactions on Graphics, vol. 24 Issue 3, Jul. 2005, 6 pages.

Dong, et al., "Image Retargeting by Content-Aware Synthesis", Published on: Mar. 26, 2014, Available at: http://arxiv.org/pdf/1403.6566.pdf.

Shan, et al., "Image-Based Surface Detail Transfer", In IEEE Computer Graphics and Applications, vol. 24 Issue 3, May, 2004, 6 pages.

Choudhury, "A framework for robust online video contrast enhancement using modularity optimization", In Proceedings of the IEEE Transactions on Circuits and Systems for Video Technology, vol. 22, No. 9, Sep. 2012.

"Interest point detection", From Wikipedia, the free encyclopedia, Jun. 1, 2013.

PCT International Search Report and Written Opinion for Application No. PCT/US2015/035219, Sep. 29, 2015.

Cvetkovic, "Image enhancement circuit using non-linear processing curve and constrained histogram range equalization", In Proceedings of the SPIE and IS&T Conference on Visual Communications and Image Processing, vol. 5308, Jan. 7, 2004.

U.S. Appl. No. 13/896,206, filed May 16, 2013, Xudong Cao.

U.S. Appl. No. 14/264,012, filed Apr. 28, 2014, David Lee.

U.S. Appl. No. 14/264,619, filed Apr. 29, 2014, Chunkit Jacky Chan.

U.S. Appl. No. 14/266,795, filed Apr. 30, 2014, David Lee.

U.S. Appl. No. 14/304,911, filed Jun. 14, 2014, Nitin Suri.

International Search Report & Written Opinion Issued in PCT Application No. PCT/US2015/036595, Mailed Date: Sep. 24, 2015, 10 Pages.

Belhumeur, "Eigenfaces vs. Fisherfaces: Recognition Using Specific Linear Projection", IEEE Transactions on Pattern Analysis and Machine Intelligence, vol. 19, No. 7, Jul. 1997.

Cao, "Face Recognition with Learning-based Descriptor", IEEE Conference on Computer Vision and Pattern Recognition (CVPR'10), Jun. 13-18, 2010.

Chen, "Bayesian Face Revisited: A Joint Formulation", Proceedings of the 12th European Conference on Computer Vision (ECCV'12), Part III, Oct. 7-13, 2012.

Chen, "Supplemental material for "Bayesian Face Revisited: A Joint Formulation, Feb. 2013.

Davis, "Information-Theoretic Metric Learning", Proceedings of the 24th International Conference on Machine Learning (ICML'07), Jun. 20-24, 2007.

Diez, "Optimization of a Face Verification System Using Bayesian Screening Techniques", Proceedings of the 23rd Iasted International Multi-Conference on Artificial Intelligence and Applications, Feb. 14-16, 2005.

Guillaumin, "Is that you? Metric Learning Approaches for Face Identification", Proceedings of the IEEE 12th International Conference on Computer Vision (ICCV'09), Sep. 29-Oct. 2, 2009.

Huang, "Labeled Faces in the Wild: A Database for Studying Face Recognition in Unconstrained Environments", Proceedings of the 10th European Conference on Computer Vision (ECCV'08), Oct. 12-18, 2008.

(56) References Cited

OTHER PUBLICATIONS

Ioffe, "Probabilistic Linear Discriminant Analysis", Proceedings of the 9th European Conference on Computer Vision (ECCV'06), May 7-13, 2006.
Kumar, "Attribute and Simile Classifiers for Face Verification", Proceedings of the 12th IEEE International Conference on Computer Vision (ICCV), Oral Session 14: Recognition, Detection and Matching, Sep. 27-Oct. 4, 2009.
Kumar, "Describable Visual Attributes for Face Verification and Image Search", IEEE Transactions on Pattern Analysis and Machine Intelligence, vol. 33, Issue 10, Oct. 2011.
Kumar, "Face Recognition Using Gabor Wavelets", Proceedings of the 40th IEEE Asilomar Conference on Signals, Systems and Computers, Oct. 29-Nov. 1, 2006.
Lei, "Face Recognition by Exploring Information Jointly in Space, Scale and Orientation", IEEE Transactions on Image Processing, vol. 20, No. 1, Jan. 2011.
Li, "Bayesian Face Recognition Using Support Vector Machine and Face Clustering", Proceedings of the 2004 IEEE Computer Society Conference on Computer Vision and Pattern Recognition (CVPR'04), Jun. 27-Jul. 2, 2004.
Li, "Probabilistic Models for Inference about Identity", IEEE Transactions on Pattern Analysis and Machine Intelligence, vol. 34, No. 1, Jan. 2012 (published online May 13, 2011).
Liang, "Face Alignment via Component-based Discriminative Search", Proceedings of the 10th European Conference on Computer Vision (ECCV'08), Part II, Oct. 12-18, 2008.
Moghaddam, "Bayesian face recognition", The Journal of Pattern Recognition Society, vol. 33, No. 11, Nov. 2000.
Nguyen, "Cosine Similarity Metric Learning for Face Verification", Proceedings of the 10th Asian Conference on Computer Vision (ACCV'10), Part II, Nov. 8-12, 2010.
Ojala, "A Generalized Local Binary Pattern Operator for Multiresolution Gray Scale and Rotation Invariant Texture Classification", Proceedings of the 2nd International Conference on Advances in Pattern Recognition (ICAPR'01), Mar. 11-14, 2001.
Phillips, "The FERET Evaluation Methodology for Face-Recognition Algorithms", IEEE Transactions on Pattern Analysis and Machine Intelligence, vol. 22, No. 10, Oct. 2000.
Ramanan, "Local Distance Functions: A Taxonomy, New Algorithms, and an Evaluation", IEEE Transactions on Pattern Analysis and Machine Intelligence, vol. 33, No. 4, Apr. 2011 (published online Jun. 28, 2010).
Seo, "Face Verification Using the LARK Representation", IEEE Transactions on Information Forensics and Security, vol. 6, No. 4, Dec. 2011.
Susskind, "Modeling the joint density of two images under a variety of transformations", Proceedings of the 2011 IEEE Conference on Computer Vision and Pattern Recognition (CVPR'11), Jun. 20-25, 2011.
Taigman, "Leveraging Billions of Faces to Overcome Performance Barriers in Unconstrained Face Recognition", arXiv:1108.1122v1, Aug. 4, 2011.
Taigman, "Multiple One-Shots for Utilizing Class Label Information", Proceedings of the British Machine Vision Conference (BMVC'09), Sep. 7-10, 2009.
Wang, "A Unified Framework for Subspace Face Recognition", IEEE Transactions on Pattern Analysis and Machine Intelligence, vol. 26, No. 9, Sep. 2004.
Wang, "Bayesian Face Recognition Using Gabor Features", Proceedings of the 2003 ACM SIGMM Workshop on Biometrics Methods and Applications (WBMA'03), Nov. 8, 2003.
Wang, "Boosted Multi-Task Learning for Face Verification with Applications to Web Image and Video Search", Proceedings of the IEEE Conference on Computer Vision and Pattern Recognition (CVPR'09), Jun. 20-25, 2009.
Wang, "Subspace Analysis Using Random Mixture Models", Proceedings of the 2005 IEEE Computer Society Conference on Computer Vision and Pattern Recognition (CVPR'05), Jun. 20-25, 2005.
Weinberger, "Distance Metric Learning for Large Margin Nearest Neighbor Classification", Proceedings of the Conference on Advances in Neural Information Processing Systems 18 (NIPS'05), Dec. 5-8, 2005.
Yin, "An Associate-Predict Model for Face Recognition", Proceedings of the IEEE Conference on Computer Vision and Pattern Recognition (CVPR'11), Jun. 20-25, 2011.
Ying, "Distance Metric Learning with Eigenvalue Optimization", Journal of Machine Learning Research, vol. 13, No. 1, Jan. 2012.
Zhang, "Two-Dimensional Bayesian Subspace Analysis for Face Recognition", Proceedings of the 4th International Symposium on Neural Networks (ISNN'07), Part II, Jun. 3-7, 2007.
Zhu, "A Rank-Order Distance based Clustering Algorithm for Face Tagging", Proceedings of the IEEE Conference on Computer Vision and Pattern Recognition (CVPR'11), Jun. 20-25, 2011.
PCT International Search Report and Written Opinion for Application No. PCT/US2015/036595, Sep. 24, 2015.
PCT International Search Report and Written Opinion for Application No. PCT/US2015/027689, Jul. 8, 2015.
Shah, "All Smiles: Automatic Photo Enhancement by Facial Expression Analysis", In Proceedings of the Conference on Visual Media Production (CVMP'12), Dec. 5-6, 2012.
Perenson, "In-depth look at Google+ photo update with the team that designed it", dpreview.com, May 17, 2013.
PCT International Search Report and Written Opinion for Application No. PCT/US2015/026971, Jul. 24, 2015.
Tian, "Handbook of Face Recognition, Chapter 11, Facial Expression Analysis", Springer, 2005.
Cootes, "Handbook of Face Recognition, Chapter 3, Modeling Facial Shape and Appearance", Springer, 2005.
Ding, "Handbook of Face Recognition, Second Edition, Chapter 12, Facial Landmark Localization", Springer, 2011.
Tsay, "Personal Photo Organizer based on Automated Annotation Framework", In Proceedings of the Fifth International Conference on Intelligent Information Hiding and Multimedia Signal Processing (IIH-MSP'09), Sep. 12-14, 2009.
Zwol, "Prediction of Favourite Photos using Social, Visual, and Textual Signals", In Proceedings of the 18th International Conference on Multimedia, Oct. 25-29, 2010.
De Neve, "Face Recognition for Personal Photos using Online Social Network Context and Collaboration", Guest Lecture at KAIST, Korea Advanced Institute of Science and Technology, Image and Video Systems Lab, Dec. 14, 2010.
Mavridis, "Friends with Faces: How Social Networks Can Enhance Face Recognition and Vice Versa", In book Computational Social Networks Analysis: Trends, Tools and Research Advances, Springer, Nov. 6, 2009.
Choi, "Face Annotation for Personal Photos Using Collaborative Face Recognition in Online Social Networks", In Proceedings of the 16th International Conference on Digital Signal Processing (DSP'09), Jul. 5-7, 2009.
Starr, "Facial recognition app matches strangers to online profiles", CNET, Tech Culture, Jan. 7, 2014.
PCT International Search Report and Written Opinion for Application No. PCT/US2015/027688, Jul. 9, 2015.
Papadopoulos, "Image Clustering Through Community Detection on Hybrid Image Similarity Graphs", In Proceedings of the 17th IEEE International Conference on Image Processing (ICIP'10), Sep. 26-29, 2010.

* cited by examiner

SALIENCY-PRESERVING DISTINCTIVE LOW-FOOTPRINT PHOTOGRAPH AGING EFFECT

BACKGROUND

Antique photographs often include various visual effects that are indicative of early photography, Such visual effects may include appearance in the photograph of film grain, dust, fibers, scratches, and tears. Antique photographs may also have borders with deckle edges. All of these characteristics contribute to the appearance of an antique photograph. Digital images are generally not prone to such visual effects. Yet, such may be desirable in some situations.

SUMMARY

The summary provided in this section summarizes one or more partial or complete example embodiments of the invention in order to provide a basic high-level understanding to the reader. This summary is not an extensive description of the invention and it may not identify key elements or aspects of the invention, or delineate the scope of the invention. Its sole purpose is to present various aspects of the invention in a simplified form as a prelude to the detailed description provided below.

The invention encompasses technologies for modifying a digital image to take on the appearance of an antique image. Such modifying is typically based on generating and rendering various effects that are blended with the input image, such as color transformation, simulating film grain, dust, fibers, tears, and vintage borders. Such effects may be rendered to various layers that are overlaid on a color transformed image resulting in what appears to be an antique image.

Many of the attendant features will be more readily appreciated as the same become better understood by reference to the detailed description provided below in connection with the accompanying drawings.

DESCRIPTION OF THE DRAWINGS

The detailed description provided below will be better understood when considered in connection with the accompanying drawings, where.

Like-numbered labels in different figures are used to designate similar or identical elements or steps in the accompanying drawings.

DETAILED DESCRIPTION

The detailed description provided in this section, in connection with the accompanying drawings, describes one or more partial or complete example embodiments of the invention, but is not intended to describe all possible embodiments of the invention. This detailed description sets forth various examples of at least some of the technologies, systems, and/or methods invention. However, the same or equivalent technologies, systems, and/or methods may be realized according to examples as well.

Although the examples provided herein are described and illustrated as being implementable in a computing environment, the environment described is provided only as an example and nota limitation. As those skilled in the art will appreciate, the examples disclosed are suitable for implementation in a wide variety of different computing environments.

Figure 1:
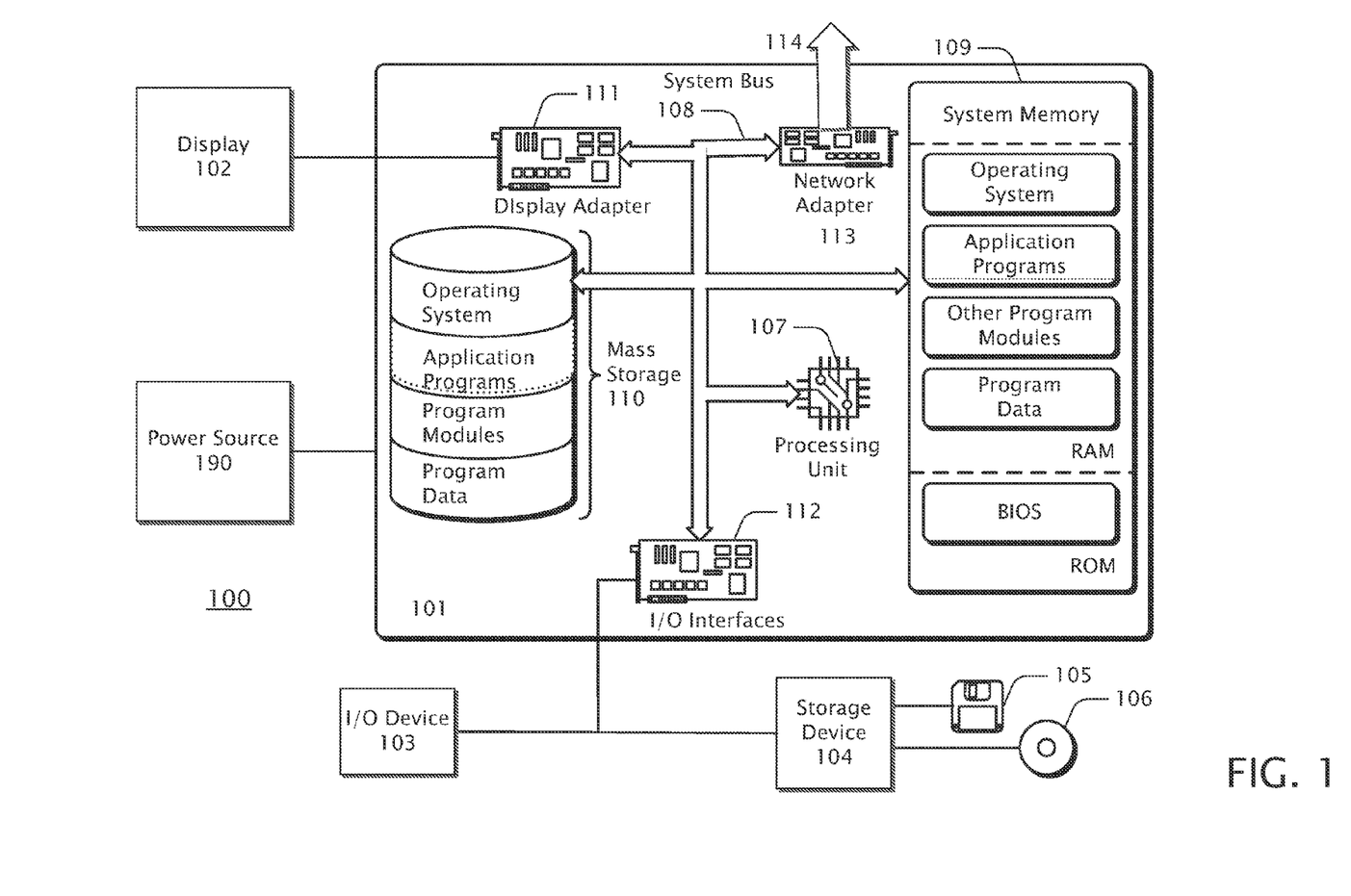
FIG. 1 is a block diagram showing an example computing environment in which the invention described herein may be implemented.

FIG. 1 is a block diagram showing an example computing environment 100 in which the invention described herein may be implemented. A suitable computing environment may be implemented with numerous general purpose or special purpose systems. Examples of well-known systems include, but are not limited to, cell phones, personal digital assistants ("PDA"), personal computers ("PC"), hand-held or laptop devices, microprocessor-based systems, multiprocessor systems, systems on a chip ("SOC"), servers, Internet services, workstations, consumer electronic devices, cell phones, set-top boxes, and the like. In all cases, such systems are strictly limited to articles of manufacture and the like.

Computing environment 100 typically includes a general-purpose computing system in the form of a computing device 101 coupled to various components, such as peripheral devices 102, 103, 101 and the like. These may include components such as input devices 103, including voice recognition technologies, touch pads, buttons, keyboards and/or pointing devices, such as a mouse or trackball, that may operate via one or more input/output ("I/O") interfaces 112. The components of computing device 101 may include one or more processors (including central processing units ("CPU"), graphics processing units ("GPU"), microprocessors ("µP"), and the like) 107, system memory 109, and a system bus 108 that typically couples the various components. Processor(s) 107 typically processes or executes various computer-executable instructions and, based on those instructions, controls the operation of computing device 101. This may include the computing device 101 communicating with other electronic and/or computing devices, systems or environments (not shown) via various communications technologies such as a network connection 114 or the like. System bus 108 represents any number of bus structures, including a memory bus or memory controller, a peripheral bus, a serial bus, an accelerated graphics port, a processor or local bus using any of a variety of bus architectures, and the like.

System memory 109 may include computer-readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 109 typically stores data, computer-executable instructions and/or program modules comprising computer-executable instructions that are immediately accessible to and/or presently operated on by one or more of the processors 107.

Mass storage devices 104 and 110 may be coupled to computing device 101 or incorporated into computing device 101 via coupling to the system bus. Such mass storage devices 104 and 110 may include non-volatile RAM, a magnetic disk drive which reads from and/or writes to a removable, non-volatile magnetic disk (e.g., a "floppy disk") 105, and/or an optical disk drive that reads from and/or writes to a non-volatile opt cal disk such as a CD ROM, DVD ROM 106. Alternatively, a mass storage device, such as hard disk 110, may include non-removable storage medium. Other mass storage devices may include memory cards, memory sticks, tape storage devices, and the like.

Any number of computer programs, files, data structures, and the like may be stored in mass storage 110, other storage devices 104, 105, 106 and system memory 109 (typically limited by available space) including, by way of example and not limitation, operating systems, application programs, data files, directory structures, computer-executable instructions, and the like.

Output components or devices, such as display device 102, may be coupled to computing device 101, typically via an interface such as a display adapter 111. Output device 102 may be a liquid crystal display ("LCD"). Other example output devices may include printers, audio outputs, voice outputs, cathode ray tube ("CRT") displays, tactile devices or other sensory output mechanisms, or the like. Output devices may enable computing device 101 to interact with human operators or other machines, systems, computing environments, or the like. A user may interface with computing environment 100 via any number of different I/O devices 103 such as a touch pad, buttons, keyboard, mouse, joystick, game pad, data port, and the like. These and other I/O devices may be coupled to processor 107 via I/O interfaces 112 which may be coupled to system bus 108, and/or may be coupled by other interfaces and bus structures, such as a parallel port, game port, universal serial bus ("USB"), fire wire, infrared ("IR") port, and the like.

Computing device 101 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 101 may be coupled to a network via network adapter 113 or the like, or, alternatively, via a modem, digital subscriber line ("DSL") link, integrated services digital network ("ISDN") link, Internet link, wireless link, or the like.

Communications connection 114, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 190, such as a battery or a power supply, typically provides power for portions or all of computing environment 100. In the case of the computing environment 100 being a mobile device or portable device or the like, power source 190 may be a battery. Alternatively, in the case computing environment 100 is a desktop computer or server or the like, power source 190 may be a power supply designed to connect to an alternating current ("AC") source, such as via a wall outlet.

Some mobile devices may not include many of the components described in connection with FIG. 1. For example, an electronic badge may be comprised of a coil of wire along with a simple processing unit 107 or the like, the coil configured to act as power source 190 when in proximity to a card reader device or the like. Such a coil may also be configure to act as an antenna coupled to the processing unit 107 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 102. I/O device 103, or many of the other components described in connection with FIG. 1. Other mobile devices that may not include many of the components described in connection with FIG. 1, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, program modules, or the like maintained in an electronic device such as a ROM. The term "software" generally refers to computer-executable instructions, code, data, applications, programs, program modules, or the like maintained in or on any form or type of computer-readable media that is configured for storing computer-executable instructions or the like in a manner that is accessible to a computing device. The term "computer-readable media" and the like as used herein is strictly limited to one or more apparatus, article of manufacture, or the like that is not a signal or carrier wave per se. The term "computing device" as used in the claims refers to one or more devices such as computing device 101 and encompasses client devices, mobile devices, one or more servers, network services such as an Internet service or corporate network service, and the like, and any combination of such.

Figure 2:
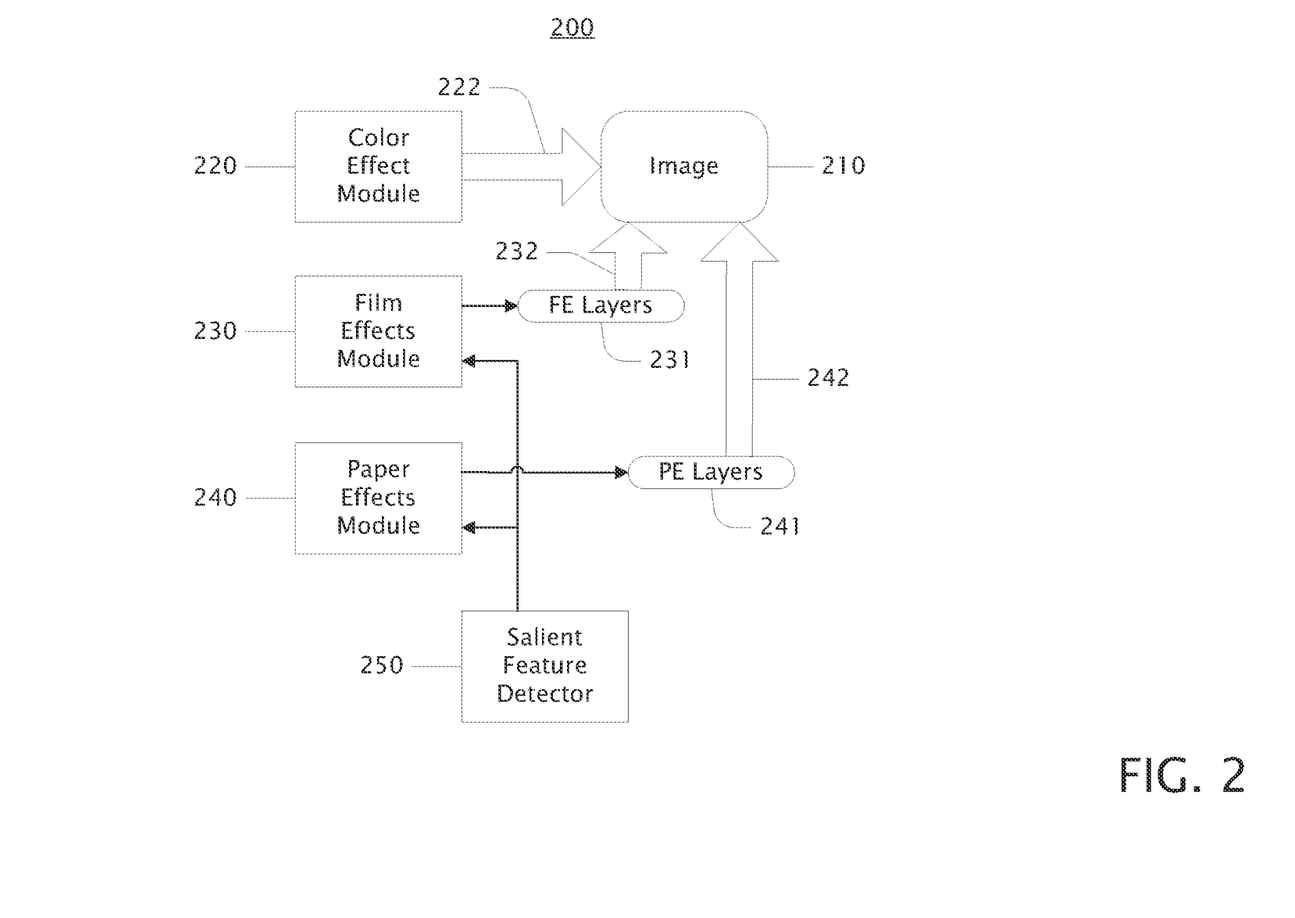
FIG. 2 is a block diagram showing an example system configured for generating a modified image from a digital image, where the modified image may be a simulated antique image.

FIG. 2 is a block diagram showing an example system 200 configured for generating a modified image from a digital image, where the modified image may be a simulated antique image. System 200 may comprise several modules including color effect module 220, film effects module 230, paper effects module 240, and/or salient feature detector 250. Each of these modules (including any sub-modules and any other modules described herein) may be implemented in hardware, firmware, software (e.g., as program modules comprising computer-executable instructions), or any combination thereof. Each such module may be implemented on/by one device, such as a computing device, or across multiple such devices and/or services. For example, modules may be implemented in a distributed fashion on/by multiple devices such as servers or elements of a network service or the like. Further, each such module (including any sub-modules) may encompass one or more sub-modules or the like, and the modules may be implemented as separate modules, or any two or more may be combined in whole or in part. The division of modules (including any sub-modules) described herein is non-limiting and intended primarily to aid in describing aspects of the invention. The term "antique" as used herein with respect to images and the like generally refers to visual characteristics that may be associated with aged vintage photographs, including film grain, dust, fibers, scratches, deckle edges, and various paper tears and the like. A digital image may be a single image, a frame of a video, or the like. A digital image may be provided as an input to system 200.

In summary, system 200 typically comprises a computing device, such as described in connection with FIG. 1, and at least one program module, such as the modules described in connection with FIG. 2, that are together configured for performing actions for generating an antique image from a digital image. Such program modules typically include computer-executable instructions that embody aspects of the methods described herein. Those skilled in the art will be familiar with encoding methods such as those provided herein as computer-executable instructions that, when executed by one or more computing devices, cause the computing devices to perform the encoded methods. In general, at least modules 220, 230, and 240 may operate sequentially in any order or in parallel on the same or different devices.

Color effect module 220 is a module that is configured for transforming the colors of an input image. Such transforming may be performed using a look-up table and/or a color curve by changing the original colors of the pixels of the input image and/or tinting the pixels. Such transforming may be used to achieve many different appearances such as black-and-white, infrared, lomography, sepia, etc. In general, black-and-white, sepia, and similar variations may be preferred for generating antique images, such as image 210. Transforming the input image generally results in a transformed image to which various effects are added. Color effect module 220 typically provides (222) this transformed image.

Film effect module 230 is a module that is configured for generating various visual film effects that may be common in vintage photographs, such as film grain, dust, fibers, and scratches. In one example, each such generated effect may be applied to one or more effect layers, such as film effect layers 231. An example film effects module 230 is further described in connection with FIG. 3. The term "effect layer" as used herein typically refers to memory into which one or more effect is rendered, where such memory is typically allocated dynamically from volatile system memory or the like as opposed to mass storage devices or the like, with the exception that such memory may be temporarily swapped out to disk-provided virtual memory or the like. By generating and rendering effects layers in temporary volatile memory, significant disk space or the like can be saved in contrast with conventional pre-defined effect layers.

Film effect layers 231 represent at least one logical canvas onto which film effects are rendered upon generation by film effects module 230. Once generated, these layers may be applied to (232) the transformed image so as to add the effects to the image.

Paper effect module 240 is a module that is configured for generating various visual paper effects that may be common n vintage photographs, such as various kinds of paper tears and picture borders. In one example, each such generated effect may be applied to one or more effect layers, such as paper effect layers 241. Once generated, these layers may be applied to the transformed image so as to add the effects to the image. An example paper effects module 240 is further described in connection with FIG. 4.

Paper effect layers 241, like film effect layers 231, represent at least one logical canvas onto which paper effects are rendered upon generation by paper effects module 240. Once generated, these layers may be applied to (232) the transformed image so as to add the effects to the image.

In one example, film effect layers and paper effect layers are functionally the same. In general, each effect layer is configured for overlaying the input image such that any given x, y coordinate on the image corresponds to the same x, y coordinate of the effect layer.

Salient feature detector 250 is a module that detects salient features in the input image and indicates the location of such features. Salient features of an image typically include faces, object(s) proximate the center of the image, and areas of the image that are in focus (given other areas that are not). In one example, the functionality of module 250 may be provided in the form of a software development kit ("SDK"). The location of a salient feature may be projected onto the various effect layers in the form of repeller points. In general, each repeller point indicates the location of a salient feature in the input image and the corresponding location in each effect layer.

Figure 3:
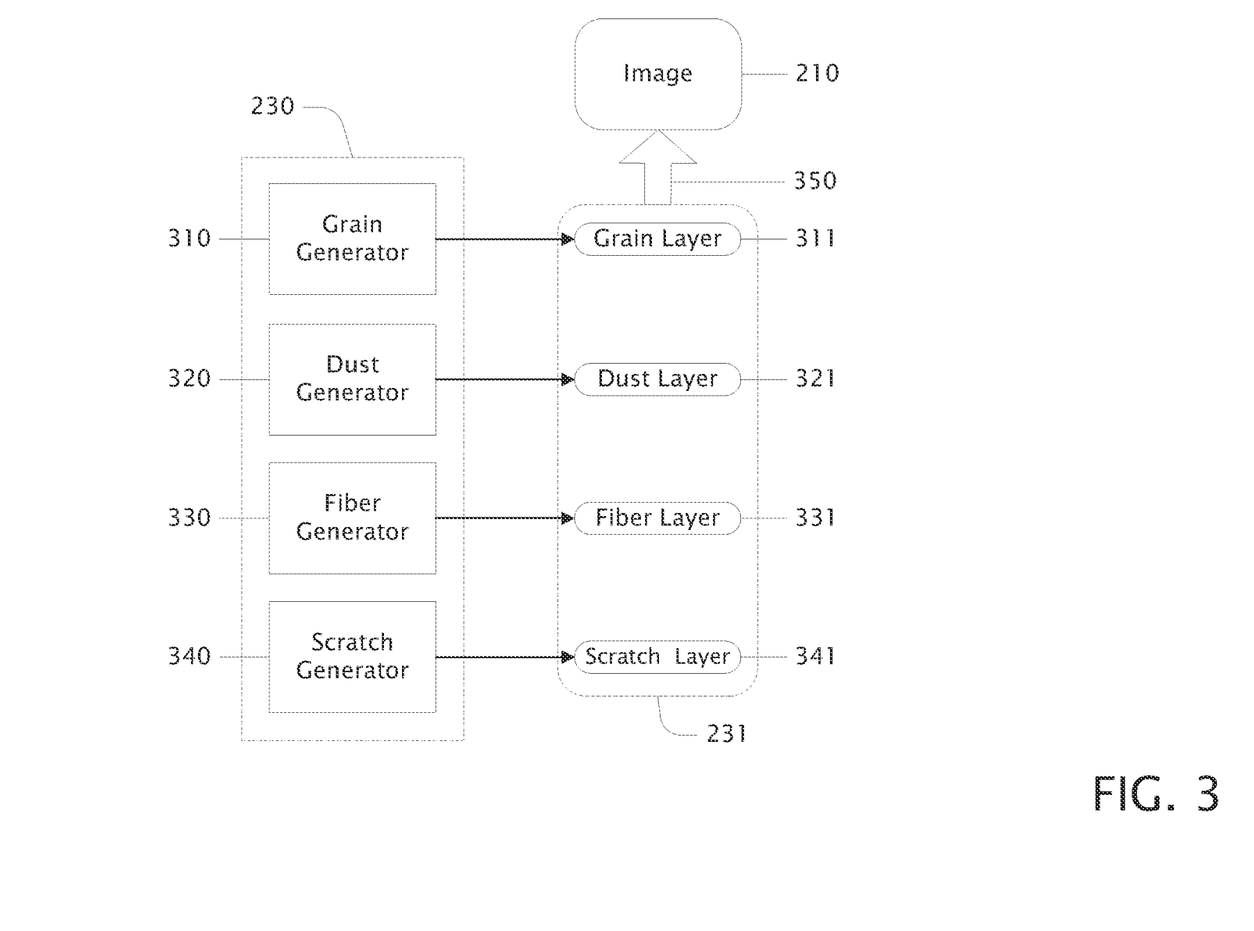
FIG. 3 is a block diagram showing an example film effect module configured for generating various visual film effects that may be common in vintage photographs, such as film grain, dust, fibers, and scratches.

FIG. 3 is a block diagram showing an example film effect module 230 configured for generating various visual film effects that may be common in vintage photographs, such as film grain, dust, fibers, and scratches. Film effect module 230 may comprise grain generator 310, dust generator 320, fiber generator 330, and/or scratch generator 340. In general, at least modules 310, 320, 330, and 340 may operate sequentially in any order or n parallel on the same or different devices.

Grain generator 310 is a module that is configured for simulating high-ISO film grain in an image. In one example, grain generator 310 performs such simulating by generating a grainy texture and it on at least one grain effect layer 311. Note that grain generator 310 generates and renders a distinct grain effect layer(s) for each input image as opposed to using a pre-existing layer such as, for example, a jpeg or film grain overlay ("FGO") or the like that can be cropped or otherwise sized and then applied to many input images. A method for such generating and rendering is described in connection with step 532 of FIG. 5. The term "high-ISO" as used herein, and as known by those skilled in the art, generally refers to film speed ratings defined by the International Organization for Standardization ("ISO"). The term "film grain" as used herein generally refers to an optical effect in a photograph resulting from a random optical texture of processed photographic film that is typically due to the presence of small particles or dye clouds during the processing of the film. The term "grainy texture" as used herein generally refers to such a random optical texture. Grain generator 310 may be encoded as computer-executable instructions and/or implemented in hardware logic in any combination.

Dust generator 320 is a module that is configured for simulating film dust in an image. In one example, dust generator 310 performs such simulating by generating simulated dust and rendering the simulated dust on at least one dust effect layer 321. Note that dust generator 320 generates and renders a distinct dust effect layer(s) for each input image as opposed to using a pre-existing layer such as, for example, a jpeg or the like that can be cropped or otherwise sized and then applied to many input images. A method for such generating and rendering is described in connection with step 534 of FIG. 5. The term "film dust" as used herein generally refers to an optical effect in a photograph resulting from the presence of particles of dust, sand, or other debris on photographic film and/or in the optical path of a camera during film exposure. Dust generator 320 may be encoded as computer-executable instructions and/or implemented in hardware logic in any combination.

Fiber generator 330 is a module that is configured for simulating film fibers and dust dumps in an image. In one example, fiber generator 330 performs such simulating by generating simulated fibers and dust dumps and rendering them on at least one dust effect layer 331. Note that fiber generator 330 generates and renders a distinct fiber effect layer(s) for each input image as opposed to using a pre-existing layer such as, for example, a jpeg or the like that can be cropped or otherwise sized and then applied to many input images. A method for such generating and rendering is described in connection with step 536 of FIG. 5. The term "film fibers" as used herein generally refers to an optical effect in a photograph resulting from the presence of fibers or the like on photographic film and/or in the optical path of a camera during film exposure. The term "dust clumps" as used herein generally refers to an optical effect in a photograph resulting from the presence of clusters of film dust or the like on photographic film and/or in the optical path of a camera during film exposure. Fiber generator 330 may be encoded as computer-executable instructions and/or implemented in hardware logic in any combination.

Scratch generator 340 is a module that is configured for simulating film scratches in an image. In one example, scratch generator 340 performs such simulating by generating simulated scratches and rendering them on at least one scratch effect layer 341. Note that scratch generator 340 generates and renders a distinct scratch effect layer(s) for each input image as opposed to using a pre-existing layer such as, for example, a jpeg or the like that can be cropped or otherwise sized and then applied to many input images. A method for such generating and rendering is described in connection with step 538 of FIG. 5. The term "film scratches" as used herein generally refers to an optical effect in a photograph resulting from any sand and/or any other material(s) scraping photographic film as it advances, scraping of the film during processing, scraping of the photographic paper during processing, and any other scraping or damage to the film or photographic paper resulting in a scratch effect in a photograph. Scratch generator 340 may be encoded as computer-executable instructions and/or implemented in hardware logic in any combination.

Arrow 350 typically indicates application of the various effect layers (e.g., 311, 321, 331, and 341) to an image 210, such as the input image or the transformed image.

Figure 4:
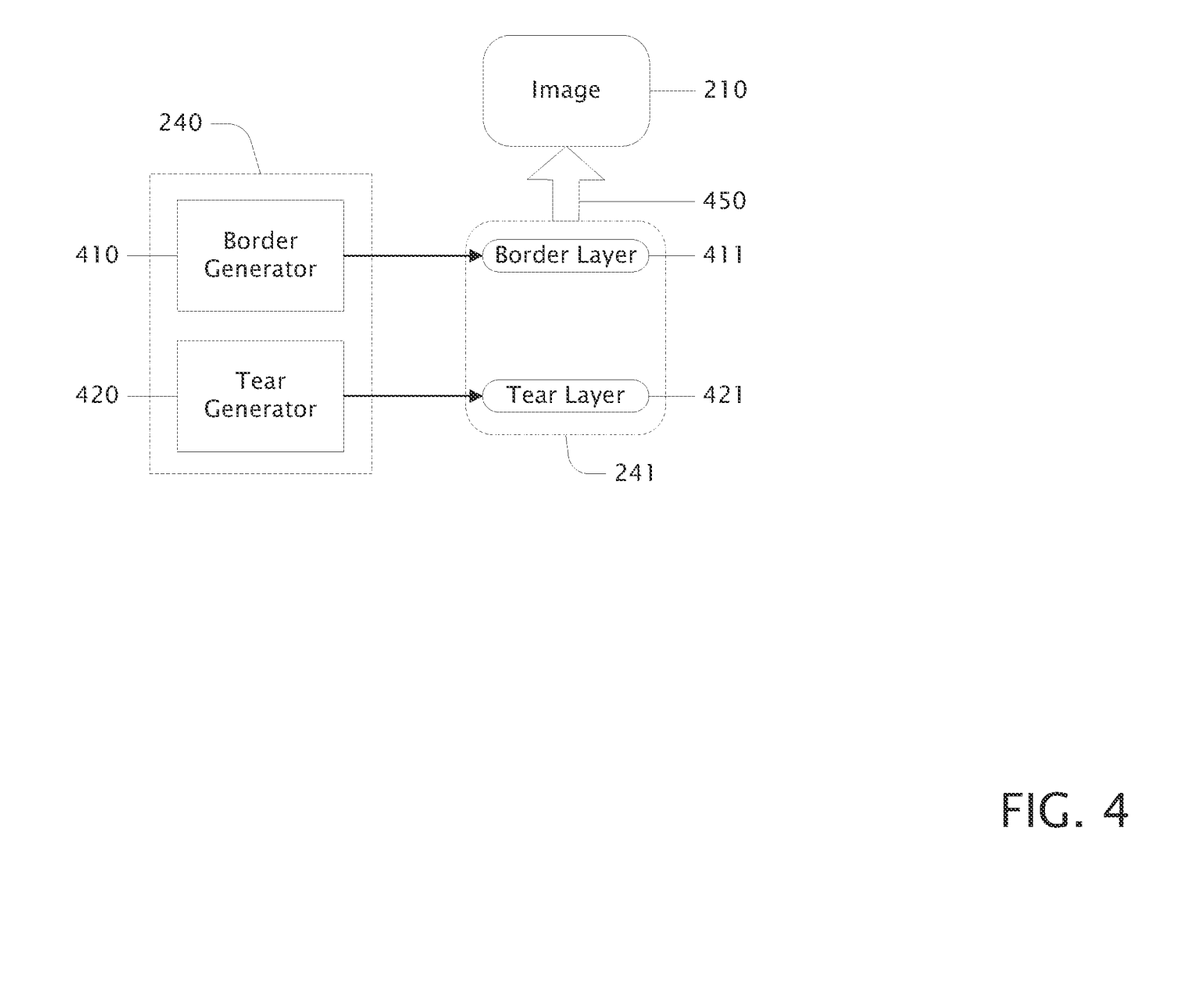
FIG. 4 is a block diagram showing an example border effect module configured for generating various visual film effects that may be common in vintage photographs, such as tears and border effects.

FIG. 4 is a block diagram showing an example border effect module 240 configured for generating various visual film effects that may be common in vintage photographs, such as tears and border effects. Border effect module 240 may comprise border generator 410 and/or tear generator 420. In general, at least modules 410 and 420 may operate sequentially in any order or in parallel on the same or different devices.

Border generator 410 is a module that is configured for simulating a photographic paper border in an image. In one example, border generator 410 performs such simulating by generating a simulated border and rendering it on at least one border effect layer 411. Note that border generator 410 generates and renders a distinct border effect layer(s) for each input image as opposed to using a pre-existing layer such as, for example, a jpeg or the like that can be cropped or otherwise sized and then applied to many input images. A method for such generating and rendering is described in connection with step 542 of FIG. 5. The terms "photographic paper border edge", "border edge", "paper edge", and "edge" as used herein generally refer to various styles of the cut edge of a border of a photograph. Examples of various paper edges that may be simulated by border generator 410 include straight edges, deckle edges, serpentine edges, and zigzag edges (such as made by pinking shears). Border generator 410 may be encoded as computer-executable instructions and/or implemented in hardware logic in any combination.

Tear generator 420 is a module that is configured for simulating various types of photographic paper tears in an mage. In one example, tear generator 420 performs such simulating by generating a simulated tear and rendering it on at least one tear effect layer 421. Note that tear generator 420 generates and renders a distinct tear effect layer(s) for each input image as opposed to using a pre-existing layer such as, for example, a jpeg or the like that can be cropped or otherwise sized and then applied to many input images. A method for such generating and rendering is described in connection with step 544 of FIG. 5. The term "photographic paper tears" as used herein generally refers to various types of tears, rips, cuts, and cut-outs in a photograph and/or on or along edges of the photograph, including missing corners or other portions of the photograph. Tear generator 420 may be encoded as computer-executable instructions and/or implemented in hardware logic in any combination.

Arrow 450 typically indicates application of the various effect layers (e.g., 411 and 421) to an image 210, such as the input image or the transformed image.

Figure 5:
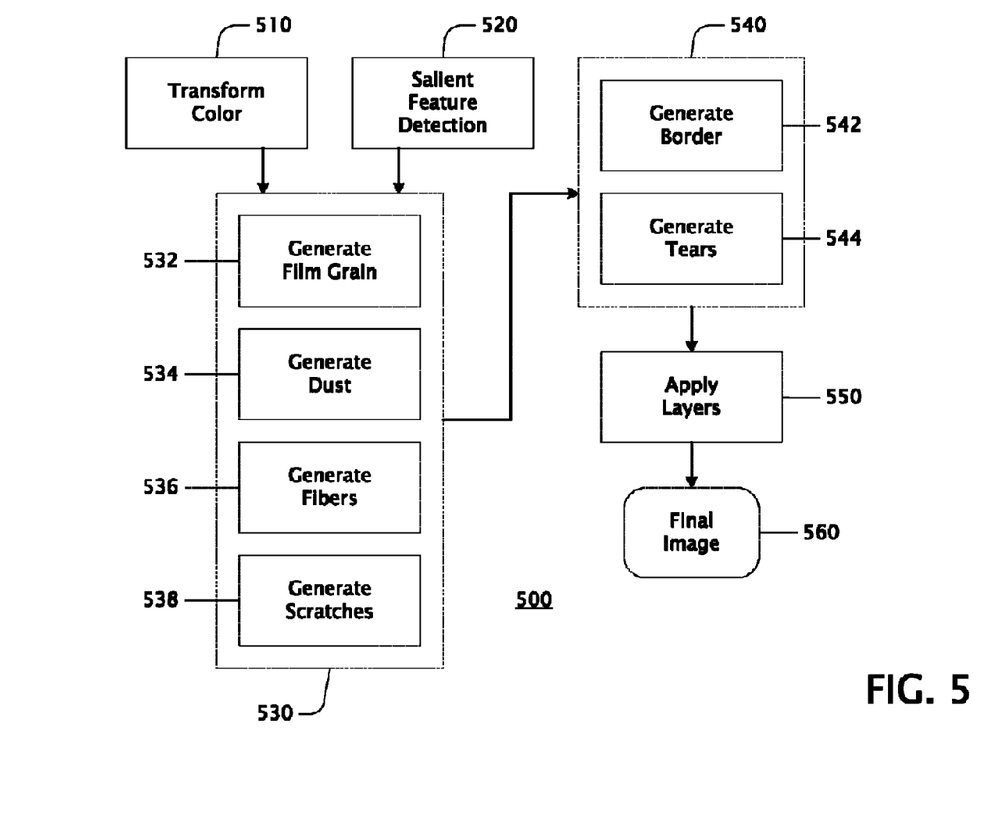
FIG. 5 is a block diagram showing an example method for modifying a digital image to take on the appearance of an antique image.

FIG. 5 is a block diagram showing an example method 500 for modifying a digital image to take on the appearance of an antique image. Such a method may be performed by system 200 or the like. In one example, method 400 (or any other method described herein) is performed on a computing device, such as describe in connection with FIG. 1, that is controlled according to computer-executable instructions of program modules that, when executed by the computing device, cause the computing device to perform some or all aspects of the method. In other examples, the modules may be implemented as firmware, software, hardware, or any combination thereof. Additionally or alternatively, the modules may be implemented as part of a system on a chip ("SoC"). In general, at least steps 510, 532, 534, 536, 538, 542, and 544 may be performed sequentially in any order or in parallel by the same or different devices. Further, examples herein include various volumes, densities, radiuses, dimensions, and such ("measures") related to various effects and the like. In some examples such measures are relative to the size of the image as viewed in inches or millimeters or the like. In other examples, these measures are in pixels and may be relative to the resolution of the image. The phrases "size of the image"

and "size of the image as viewed" as used herein generally refer to the size of the image on a display or a printed page or the like. In various examples, the size of a display on which an image is viewed may be used in place of the size of the image itself. For example, if the image was scaled to fill the display, this size may be used as the image size.

Step 510 of method 500 typically indicates transforming the colors of an input image. Such transforming may be performed by color effect module 220. In one example, step 510 is typically performed by changing and/or tinting the color of each pixel of the image according to a look-up table and/or a color curve or the like. Such transforming may result in a transformed image that is in a black-and-white, infrared, lomography, sepia, or other color scheme. Once the image transformation is complete, method 500 typically continues at step 530.

Step 520 of method 500 typically indicates detecting salient features in an image, such as the input image and/or the transformed image. Such detecting may be performed by salient feature detector 250. By detecting the locations of salient features in an image, such salient features may be preserved in final image 560 by distorting or adjusting uniform distributions of effects (such as simulated dust, fibers, scratches, etc.) so that such effects are less likely to cover the salient features of the image. The phrase "salient features" as used herein generally refers to the important features of the image, which typically include faces and facial features, object(s) proximate the center of the image, and/or areas of the image that are in focus. Facial features typically include at least the eyes, eyebrows, nose, and mouth of a face detected in an image.

In one example, detecting at least some salient features in an image may be performed according to technologies such as those described in U.S. patent application Ser. No. 14/264, 012 filed on Apr. 28, 2014, and entitled "Creation of Representative Content based on Facial Analysis" that is hereby incorporated by reference in its entirety.

Step 520 may also include distorting or adjusting uniform distributions of effects (such as simulated dust, fibers, scratches, etc) so that such effects are less likely to cover the salient features of an image. This portion of step 520 may be performed by salient feature detector 250 and/or by film effect module 230. Give the location of a salient feature in an image based on salient feature detection, this location is typically projected onto the various effect layers in the form of a repeller point, Thus location of such a repeller on an effect layer typically corresponds to a location of the salient feature on the image, such as the center of the feature or the like. In various examples, such repeller points are used when rendering effects on effect layers to adjust the distribution or placement of an effect to reduce the probability that the effect will cover the corresponding salient feature. For example, given a detected face in an image, where the face is relatively small compared to the overall size of the image, a repeller point may be located proximate the center of the face. In another example where a face makes up much of the image, repeller points may be located proximate the centers of the eyes. In another example where only a particular area of the image is in focus, a repeller point may be located proximate the center of the in-focus area.

Given repeller points projected on an effect layer, the distribution or placement of the corresponding effects are generally adjusted based on the location of the repeller points. For example, for any particular element of an effect (such as a simulated dust grain or scratch), a distance between the randomly determined location of the element and the closest repeller point may be calculated. Given this distance, a probability that the element should be placed at the randomly determined location may be computed. In one example, this probability approaches zero as the randomly determined location approaches the location of the repeller point. Then a decision may be made whether to place the element at the randomly determined location, or to discard it, based on the computed probability, In another example, the element may be located farther from the repeller point based on the decision and/or the computed probability.

Once the salient features are detected and repeller points are projected, method 500 typically continues at steps 510, 530, and/or 540. Adjusting distributions or placement of effect elements may be performed during or after effect rendering.

Step 530 of method 500 typically indicates generating various visual film effects that may be common in vintage photographs, such as film grain, dust, fibers, and scratches. Such generating may be performed by film effects module 230 or its various sub-modules.

Step 532 of method 500 typically indicates generating a film grain layer 311. Such generating may be performed by grain generator 310. In one example, a uniform noise texture is generated and rendered on at least one grain effect layer 311. In this example, the texture generating and rendering may comprise: (1) setting each pixel in the effect layer to a random gray level between pure white and pure black, (2) setting a transparency level of each pixel to a high level of transparency, such as between 1% and 10% where 0% is fully transparent and 100% is opaque, and (3) blurring each pixel n the effect layer based on a particular blur radius. In various examples, the transparency level is 5%, the particular blur radius is 3 pixels, and the blurring is based on a Gaussian blur function. The term "gray levels" as used herein generally refers to the various shades of gray between true white and true black, particularly those shades typically represented in computer graphics. The steps for generating and rendering the uniform noise texture may be encoded as computer-executable instructions and/or implemented in hardware logic in any combination.

Step 534 of method 500 typically indicates generating a dust layer 321. Such generating may be performed by dust generator 320. In one example, a uniform distribution of filled ellipses is generated and rendered on at least one dust effect layer 321. A size of each ellipse is randomly determined up to a maximum pixel radius that is typically relative to the size of the input image. A volume of the ellipses in the distribution may be based on a size of the image. When applied to the image, the ellipses of the effect layer(s) are typically not pixel aligned. By avoiding pixel alignment, sub-pixel effects due to anti-aliasing tend to add interest detail to the simulated dust without requiring additional complex geometry.

In one example, the simulated dust generating and rendering may comprise: (1) generating a number of ellipses that are rendered in a uniform distribution on a dust effect layer(s), where each ellipses is generated with a random x and y radiuses up to a maximum, and (2) adjusting the distribution according to any repeller points projected onto the dust effect layer(s) in step 520. An example method of such adjusting is provided in connection with step 520. In various examples, the generated ellipses are rendered in a light gray level or dark gray level depending the final image 560 type (such as a negative or positive image), any light gray used in rendering is pure white, any dark gray used in rendering is pure black, the density of generated ellipses is about 10 per square inch, and the maximum radius is approximately 0.005 inches. The term "light gray" as used herein generally refers to the lighter 50% of gray levels and also includes pure white. The term "dark gray" as used herein generally refers to the darker 50% of gray levels and also includes pure black. The steps for generating and rendering simulated dust may be encoded as computer-executable instructions and/or implemented in hardware logic in any combination.

Step 536 of method 500 typically indicates generating a fiber layer 331. Such generating may be performed by fiber generator 330. In one example, simulated fibers and/or dust clumps are generated and rendered on at least one fiber effect layer 321. In some examples, simulated fibers may be rendered on one fiber effect layer, and simulated dust clumps may be rendered on another. Further, fibers and/or dust clumps within one size range may be rendered on one fiber effect layer while those in other size ranges may be rendered on other fiber effect layers.

The generating and rendering of simulated fibers and/or dust dumps is essentially the same that as for simulated dust, as described for step 534, except that, rather than individual ellipses, groups of ellipses are generated and rendered, where the distance between the ellipses in a group is within a maximum separation distance that is typically relative to the size of the input image, and where the maximum size of threads and dust clumps is within a maximum size that is typically relative to the size of the input image. When applied to the image, the ellipses/groups of the effect layer(s) are typically not pixel aligned.

In one example, the simulated fiber and/or dust clump generating and rendering may comprise: (1) generating a number of ellipse groups that are rendered in a uniform distribution on a thread effect layer(s), where each ellipse is generated with a random radius up to a maximum that is typically between 1 and 10 pixels, where each group is generated with a random size up to a maximum, and (2) adjusting the distribution according to any repeller points projected onto the fiber effect layer(s) in step 520. An example method of such adjusting is provided in connection with step 520. In various examples, the generated ellipses are rendered in a light gray level or dark gray level depending the final image 560 type (such as a negative or positive image), any light gray used in rendering is pure white, any dark gray used in rendering is pure black, the density of generated threads is 0.25 per square inch, the density of clumps is 0.5 per square inch, the maximum radius is 0.01 inches, and the maximum group size is 0.1 inch. The steps for generating and rendering simulated fibers and/or dust clumps may be encoded as computer-executable instructions and/or implemented in hardware logic in any combination.

Step 538 of method 500 typically indicates generating a scratch layer 341. Such generating may be performed by scratch generator 340. In one example, simulated scratches are generated and rendered on at least one scratch effect layer 341. In one example, simulated scratches are generated and rendered on at least one fiber effect layer 321. In some examples, simulated scratches within one size range may be rendered on one scratch effect layer while those in other size ranges may be rendered on other scratch effect layers.

Simulated scratches are typically generated and rendered as straight or curved lines, where any one scratch may include occasional skips or breaks in the line. In one example, small scratches are rendered on one scratch effect layer and large scratches are rendered on another scratch effect layer. Roughly five times as many small scratches may be rendered as large scratches. Large scratches may be roughly five times the maximum size of small scratches. In some examples, most scratches tend to be lengthwise oriented in a direction representing a direction of film advance in a camera. When applied to the image, the scratches of the effect layer(s) are typically not pixel aligned.

In one example, the simulated scratch generating and rendering may comprise: (1) selecting a number of lines (long and/or short) for rendering within a maximum, (2) selecting a starting point on a layer for a line, (3) selecting a direction on the layer for the line, (4) selecting a type of line (e.g., straight or curved), (5) selecting a length for the line within a maximum, (6) selecting a width for the line within a maximum, (7) adjusting parameters according to any repeller points projected onto the scratch effect layer(s) in step 520, and (8) rendering the lines according to the selected parameters. Any of the parameters may be randomly selected within any maximums. In various examples, the maximum density of lines is 0.1 per square inch, the maximum length is 0.5 inches, the maximum width is 0.0001 inches. In one example, curved lines may be based on a Bezier curve. The steps for generating and rendering the scratches may be encoded as computer-executable instructions and/or implemented in hardware logic in any combination.

Step 540 of method 500 typically indicates generating various visual paper effects that may be common in vintage photographs, such as various kinds of paper tears and picture borders. Such generating may be performed by border effects module 240 or its various sub-modules.

Figure 6:
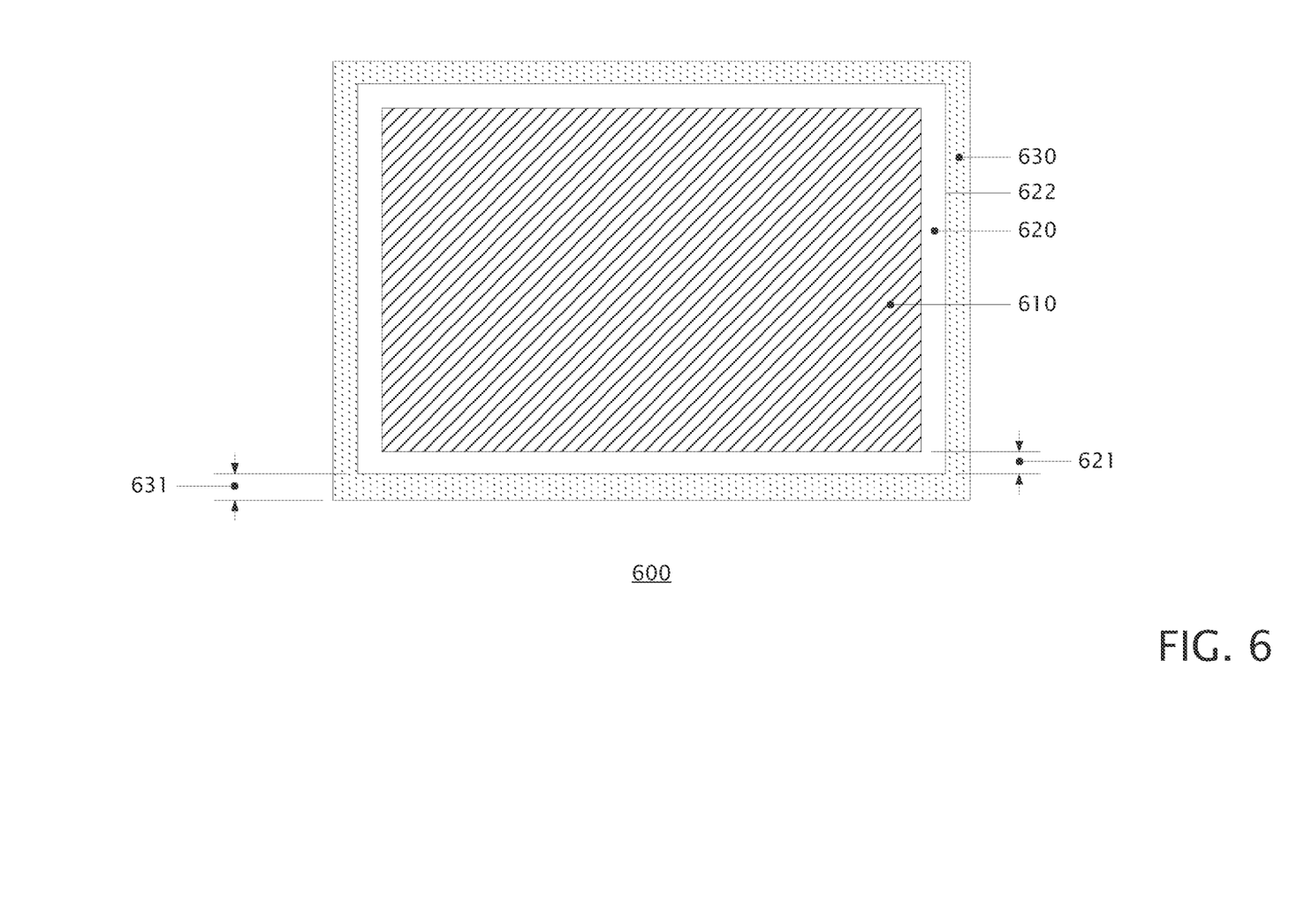
FIG. 6 is a diagram showing an example border build-up.

FIG. 6 is a diagram showing an example border build-up 600. No particular scale is intended or implied. In this example, an image 610 is overlaid on a border that is overlaid on a background 630, each of which may represent one or more effect layers. Callout 622 indicates a side of the border, callout 621 indicates a width of a side of the border, and callout 631 indicates a width of a side of the background.

Step 542 of method 500 typically indicates generating a border layer 411. Such generating may be performed by border generator 410. In one example, a simulated photographic paper border 620 is generated and rendered on at least one border effect layer 411. One such border effect layer may be a background layer that simulates a background 630 for the border 620. Another border effect layer may be a photographic paper border layer onto which is typically rendered a simulated paper border 620 that simulates a width 621 of photographic paper around the image 610. Image layer 610 may be overlaid on border layer 620 which may be overlaid on background layer 630. Alternatively, the background and border may be rendered on the same layer (620 and 630 combined). Such border effect layer(s) may be used in a border build-up 600.

In various examples, the border 620 may be generated and rendered to simulate any characteristics desired, such as photographic paper characteristics, This includes filling the border 620 with any color scheme and/or texture scheme desired. A desired edge 622 style or pattern may be applied to the border. The width 621 of the border may be any desired width, including zero. Thus, border 620 may be optional. In this example (no border), the desired edge 622 may be applied to image layer 610. Further, the width of each side may vary from that of the others, In various examples, the background 630 may be generated and rendered to provide a background for a border 620. Such a background is typically filled with a "neutral color", defined herein as black, white, or a color selected from the input image or the transformed image. The width 631 of the background may be any desired width, including zero. Thus, border 630 may be optional. Further, the width of each side may vary from that of the others.

In various examples, the image 610, or a cropped version thereof, may be scaled to fit within the simulated border 620 of the border effects layer(s), or the border effect layer(s) may be scaled to fit around the image 610, or a cropped version thereof.

In one example, the border and background generating and rendering may comprise: (1) generating a background that is rendered on a border effect layer(s), (2) generating a border that is rendered on a border effect layer(s). In various examples, the border is overlaid on the background. These steps for generating and rendering the border and background may be encoded as computer-executable instructions and/or implemented in hardware logic in any combination.

Examples of various edges 622 that may be simulated on photographic paper borders 620 by border generator 410 include straight edges, deckle edges, serpentine edges, and zigzag edges. The term "deckle edge" as used herein typically refers to the irregular edges of early sheets of paper that were manually produced in a deckle frame.

Figure 7:
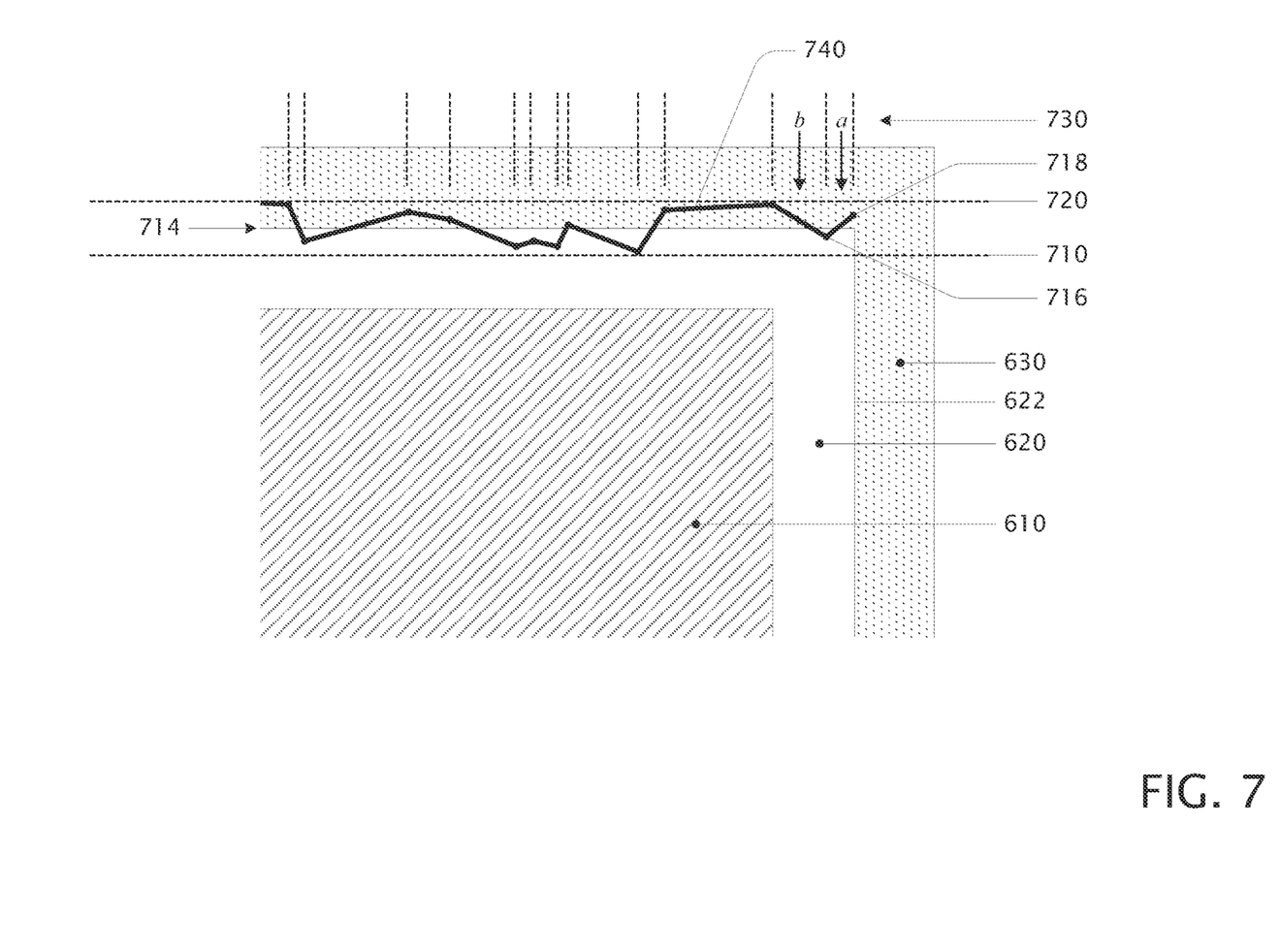
FIG. 7 is a diagram that shows an exploded view of a portion of FIG. 6 that further illustrates a portion of a simulated deckle edge.

FIG. 7 is a diagram that shows an exploded view of a portion of FIG. 6 that further illustrates a portion of a simulated deckle edge 740 generated on side 714 based on random segment widths 730 with each of their vertices (such as 716 and 718) moved a random distance toward or away from image 610 within inner and outer bounds 710 and 720 respectively. No particular scale is intended or implied. Note shown, all space outside edge 740 may be filled to match background 630 and all space inside edge 740 may be filled to match border 620 or, if no border, with image and any overlaid effect layer content.

In one example, a method for simulated deckle edge generating and rendering may comprise: (1) dividing a side (e.g., 714) into a random number of line segments (e.g., as indicated by the dark lines 740 marked off by imaginary hash marks 730), where each segment has a random segment width (e.g., as indicated by the spacing between the imaginary hash marks 730), where each segment has two end vertices (e.g., 716 and 718 of segment a), and where each vertex is generally shared with a neighboring segment (e.g., vertex 716 shared by segments a and b), (2) moving each vertex a random offset from the side either toward or away from image 610 within inner bound 710 and outer bound 720. The maximum segment width for a deckle edge in this example may be between 0.02 and 0.08 inches, or between 2% and 20% of the border width, The maximum edge amplitude (inner plus outer bounds) may be between 0.05 to 0.1 inches, or between 5% and 25% of the border width. In various examples, the maximum segment width is 0.08 inches, and the maximum edge amplitude is 0.10 inches. These steps for generating and rendering a deckle edge may be encoded as computer-executable instructions and/or implemented in hardware logic in any combination.

Other types of edges may be generated and rendered using similar techniques with straight and/or curved and/or with longer and/or shorter line segments as appropriate to the edge style. For example, for a zigzag edge the segments may each be the same width with consistent, alternating vertex offsets. A serpentine edge may be similarly created based on an 'S'-shaped line or the like.

Figure 8:
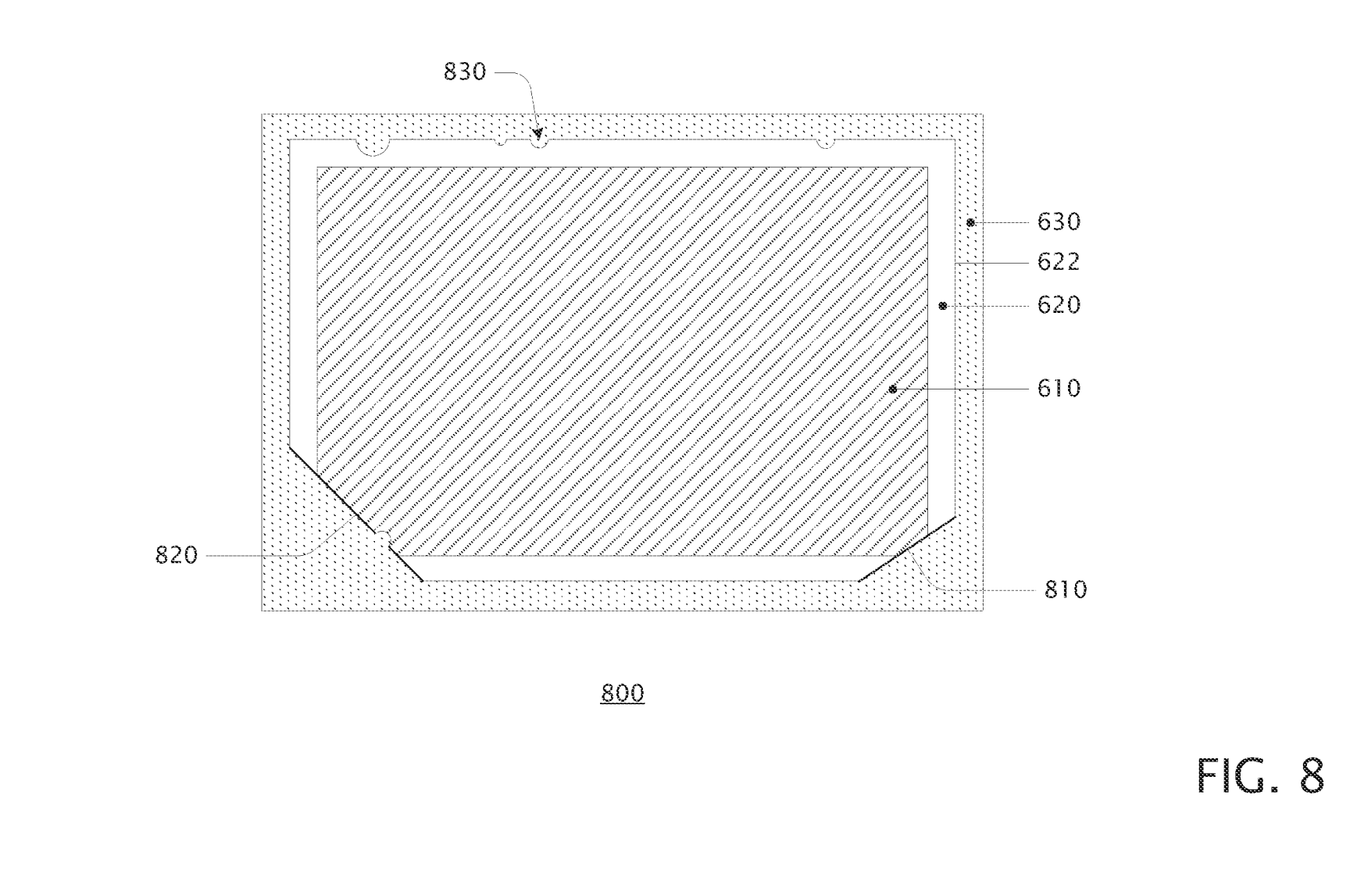
FIG. 8 is a diagram that shows simulated tears in the paper of a picture.

FIG. 8 is a diagram that shows simulated tears 810, 820, and 830 in the paper of a picture. No particular scale s intended or implied. One type of tear is a half circle or the like, such as shown in example 830. Such tears may be simulated in the sides of an image. Another type of tear is a torn corner, such as shown in examples 810 and 820. In each case, the torn away portion is generally filled to match the background 630.

Figure 9:
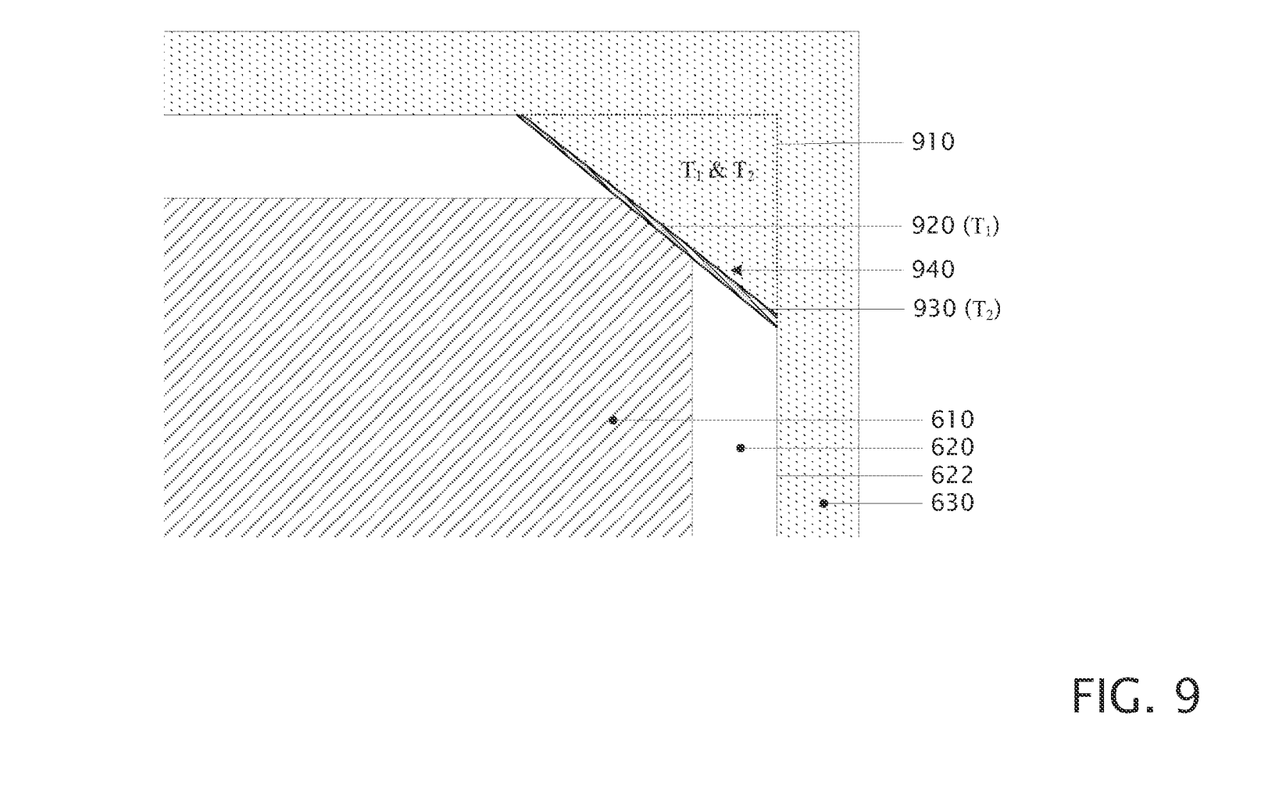
FIG. 9 is a diagram that shows an exploded view of a portion of FIG. 8 that further illustrates the detail of a simulated tear.

FIG. 9 is a diagram that shows an exploded view of a portion of FIG. 8 that further illustrates the detail of a simulated tear. No particular scale is intended or implied. Such tears are typically generated based on two largely overlapping shapes, one smaller than the other, such as example triangles $T_1$ and $T_2$ (920 and 930 respectively). The smaller shape is typically covers most of the larger shape and is typically filled to match the background 630. The tear is typically simulated by the exposed portion of the larger shape, where the exposed portion is defined herein as a "tear space", such as example tear space 940, and is typically bounded on one side by a side of the lower shape (e.g., the side of $T_1$ indicated by callout 930) and on the other side by a side of the upper shape (e.g., the side of $T_2$ indicated by callout 920). These tear space hounding sides may be irregular—that is, they need not be parallel with each other, or even of the same shape. Indeed, some irregularity in these sides may increase the realism of a simulated tear. For example, for half circle tears such as example 830, the two shapes may be circles that are offset from each other, that are misshapen, and/or otherwise inconsistent, this resulting in an irregular tear space.

The tear space 940 is typically filled with a color and/or texture that simulate the color and texture of torn photographic paper along with paper fibers exposed by such a tear. Further, the tear space bounding sides of the two shapes may be rendered with a deckled edge such as described in connection with FIG. 7. In this example, the maximum segment width and maximum edge amplitude may be percentages of the length of a bounding side, such as between 1% and 7% of the bounding side length.

Step 544 of method 500 typically indicates generating a tear layer 421. Such generating may be performed by tear generator 420. In one example, a simulated tear is generated and rendered on at least one tear effect layer 421. In this example, simulated tear generating and rendering comprises: (1) generating and rendering overlapping shapes that present a tear space, (2) filling the upper overlapping shape to match a background, (3) filling the tear space a color and/or texture that simulate the color and texture of torn photographic paper along with paper fibers exposed by such a tear. These steps for generating and rendering a tear may be encoded as computer-executable instructions and/or implemented in hardware logic in any combination.

Step 550 of method 500 typically indicates applying one or more of the generated and rendered effect layers to the input image or the transformed image resulting in final image 560. Such applying is performed by blending the various effects layers together. In one example, such blending is based on an alpha transparency channel of each layer such that only the rendered effects (e.g., film grain, dust, fibers, scratches, borders, tears, and the like) obscure details of the input image.

In view of the many possible embodiments to which the invention and the forgoing examples may be applied, it should be recognized that the examples described herein are meant to be illustrative only and should not be taken as limiting the scope of the invention. Therefore, the invention as described herein contemplates all such embodiments as may come within the scope of the claims and any equivalents thereto.

The invention claimed is:

1. A method performed on at least one computing device, the method comprising:
   detecting a salient feature in an image;
   projecting a repeller point at a location on effect layers that correspond to a location of the salient feature in the image;

rendering film effects on the effect layers, where the rendered film effects include simulated dust, fiber, and scratch effects, where the rendering comprises positioning at least one of the rendered film effects at a random position on at least one of the effect layers;

adjusting the positioning according to a probability computed based on a distance between the random position and the location of the repeller point;

generating a border effect on at least one other of the effect layers; and blending, in response to the adjusting and the generating, the effect layers with the image resulting in a final image.

2. The method of claim 1 further comprising transforming colors of the image.

3. The method of claim 1 where the rendered film effects further include simulated film grain.

4. The method of claim 1 further comprising generating a tear effect.

5. The method of claim 4 where the tear effect comprises a deckle edge on a side bounding a tear space of the tear effect.

6. The method of claim 1 where the border effect comprises a deckle edge.

7. The method of claim 6 where the deckle edge is based on a segment width and an edge amplitude.

8. computing device comprising:
a processor;
memory coupled to the processor;
an input device that is coupled to the memory and via which the computing device receives an image and stores the received image in the memory;
a salient feature detector implemented at least in part by the processor and via which the computing device detects a salient feature in an image stored in the memory;
the processor that is coupled to the memory and via which the computing device projects a repeller point at a location on effect layers that correspond to a location of the salient feature in the image;
a film effects module implemented at least in part by the processor and configured to render film effects on the effect layers, where the rendered film effects include simulated dust, fiber, and scratch effects, where at least one of the rendered film effects is positioned at a random position on at least one of the effect layers according to a probability computed based on a distance between the random position and the location of the repeller point;
a border generator implemented at least in part by the processor and configured to generate a border effect on at least one other of the effect layers; and
the processor via which the computing device blends the effect layers that comprise the rendered file effects and the generated border effect with the image resulting in a final image.

9. The computing device of claim 8 comprising a color effect module implemented at least in part by the processor and configured to transform colors of the image.

10. The computing device of claim 8 where the rendered film effects further include simulated film grain.

11. The computing device of claim 8 comprising a tear generator implemented at least in part by the processor and configured to generate a tear effect.

12. The computing device of claim 11 where the tear effect comprises a deckle edge on a side bounding a tear space of the tear effect.

13. The computing device of claim 8 where the border effect comprises a deckle edge.

14. The computing device of claim 13 where the deckle edge is based on a segment width and an edge amplitude.

15. At least one computer-readable medium storing computer-executable instructions that, when executed by at least one computing device, cause the at least one computing device to perform actions comprising:
detecting a salient feature in an image;
projecting a repeller point at a location on effect layers that correspond to a location of the salient feature in the image;
rendering film effects on the effect layers, where the rendered film effects include simulated dust, fiber, and scratch effects, where the rendering comprises positioning at least one of the rendered film effects at a random position on at least one of the effect layers;
adjusting the positioning according to a probability computed based on a distance between the random position and the location of the repeller point;
generating a border effect on at least one other of the effect layers; and
blending, in response to the adjusting and the generating, the effect layers with the image resulting in a final image.

16. The at least one computer-readable medium of claim 15, the actions further comprising transforming colors of the image.

17. The at least one computer-readable medium of claim 15 where the rendered film effects further include simulated film grain.

18. The at least one computer-readable medium of claim 15, the actions further comprising generating a tear effect, where the tear effect comprises a deckle edge on a side bounding a tear space of the tear effect.

19. The at least one computer-readable medium of claim 15 where the border effect comprises a deckle edge.

20. The at least one computer-readable medium of claim 19 where the deckle edge is based on a segment width and an edge amplitude.

* * * * *